United States Patent

Kawauchi et al.

[11] Patent Number: 5,923,783
[45] Date of Patent: Jul. 13, 1999

[54] IMAGE ENCODING APPARATUS AND IMAGE DECODING APPARATUS

[75] Inventors: Kenichi Kawauchi; Taro Yokose; Shunichi Kimura, all of Nakai-machi, Japan

[73] Assignee: Fuji Xerox Co., Ltd., Tokyo, Japan

[21] Appl. No.: 08/853,950

[22] Filed: May 9, 1997

[30] Foreign Application Priority Data

Aug. 7, 1996 [JP] Japan .................................. 8-208124

[51] Int. Cl.⁶ ..................................................... G06K 9/36
[52] U.S. Cl. ......................... 382/233; 382/232; 382/244; 382/245; 382/246
[58] Field of Search ................................. 382/232, 233, 382/235, 239, 238, 244, 245, 246; 358/426, 404, 430, 433, 539, 133, 261.3, 260, 136, 138, 261, 263; 348/411, 409

[56] References Cited

U.S. PATENT DOCUMENTS

| | | | |
|---|---|---|---|
| 4,144,547 | 3/1979 | Stoffel | 358/260 |
| 4,470,072 | 9/1984 | Tanaka et al. | 358/260 |
| 4,633,325 | 12/1986 | Usubuchi | 358/260 |
| 4,720,743 | 1/1988 | Iinuma et al. | 358/133 |
| 5,121,216 | 6/1992 | Chen et al. | 358/261.3 |

FOREIGN PATENT DOCUMENTS

A-8-31074  2/1996  Japan .............................. G11B 19/02

OTHER PUBLICATIONS

"A Guide for Document Data Compressing Algorthm", Uematsu, T., CQ Publishing Co., pp. 32–33, 1994.

*Primary Examiner*—Jose L. Couso
*Assistant Examiner*—Duy M. Dang
*Attorney, Agent, or Firm*—Oliff & Berridge, PLC

[57] ABSTRACT

The present invention aims to execute effective compression even in the case where inputted image information has the bit number smaller than that of a pixel value, such as a tag, and besides in the case where the entropy increases if a prediction error obtained by subtraction of a value of a neighboring pixel from that of an object pixel is used for calculation of the entropy.

According to the present invention, in an image encoding apparatus, the inputted image information is made to be packed image data of a fixed length and provided to a couple of predicting elements and a couple of prediction error calculating elements. The packed image data and prediction errors outputted from the couple of prediction error calculating elements are provided to a prediction error selecting element and one of the data and prediction errors having a smallest entropy is selected. A selecting element outputs an identification number of one of the predicting elements which succeeds in prediction, and if the predicting elements fail in prediction, the selecting element outputs the data or prediction error selected by the prediction error selecting element. The output from the selecting element is encoded by an encoding element to Huffman code, for example

16 Claims, 10 Drawing Sheets

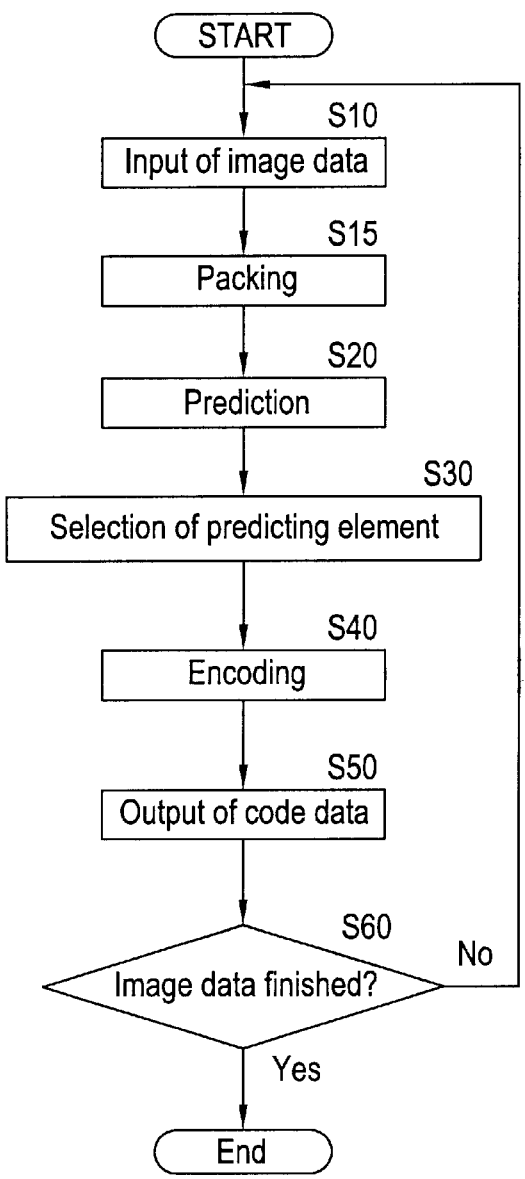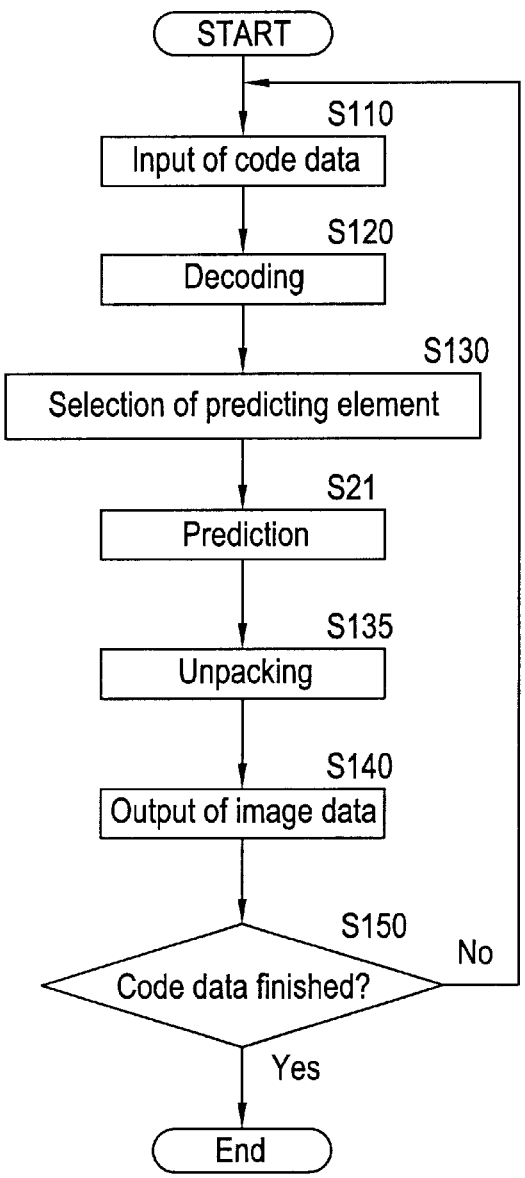

Fig. 6(a)

| | MSB | | | | | | | LSB |
|---|---|---|---|---|---|---|---|---|
| T2 | 0 | 0 | 0 | 0 | 1 | 0 | 0 | 0 |
| T3 | 0 | 0 | 0 | 1 | 0 | 0 | 0 | 0 |
| T4 | 0 | 0 | 0 | 0 | 1 | 0 | 0 | 0 |

T2 xor T3 →
T3 xor T4 →

| 0 | 0 | 0 | 1 | 1 | 0 | 0 | 0 |
|---|---|---|---|---|---|---|---|

T2 sub T3 →

| 1 | 1 | 1 | 1 | 1 | 0 | 0 | 0 |
|---|---|---|---|---|---|---|---|

T3 sub T4 →

| 0 | 0 | 0 | 0 | 1 | 0 | 0 | 0 |
|---|---|---|---|---|---|---|---|

Fig. 6(b)

| | MSB | | | | | | | LSB |
|---|---|---|---|---|---|---|---|---|
| T6 | 0 | 0 | 1 | 0 | 0 | 0 | 0 | 0 |
| T7 | 0 | 0 | 0 | 1 | 1 | 1 | 1 | 1 |
| T8 | 0 | 0 | 0 | 1 | 1 | 1 | 1 | 0 |

T6 xor T7 →

| 0 | 0 | 1 | 1 | 1 | 1 | 1 | 1 |
|---|---|---|---|---|---|---|---|

T7 xor T8 →

| 0 | 0 | 0 | 0 | 0 | 0 | 0 | 1 |
|---|---|---|---|---|---|---|---|

T6 sub T7 →
T7 sub T8 →

| 0 | 0 | 0 | 0 | 0 | 0 | 0 | 1 |
|---|---|---|---|---|---|---|---|

Fig. 7

| Symbol | Number of Times of Occurrence | Occurrence Rate | Code Word |
|---|---|---|---|
| $a_1$ | 8 | 1/3 | 0 |
| $a_2$ | 4 | 1/6 | 100 |
| $a_3$ | 4 | 1/6 | 101 |
| $a_4$ | 4 | 1/6 | 110 |
| $a_5$ | 2 | 1/12 | 1110 |
| $a_6$ | 2 | 1/12 | 1111 |

Examples of Distribution of Prediction Error

IMAGE ENCODING APPARATUS AND IMAGE DECODING APPARATUS

BACKGROUND OF THE INVENTION

1. Field of the Invention

The present invention relates to an image encoding and decoding apparatus and in particular relates to lossless predictive encoding on inputted image information of multivalue.

2. Discussion of the Related Art

In general, an image has a large amount of data, and therefore, it is normally compressed by encoding when it is to be stored or transmitted. The encoding method of the image data is roughly classified into a lossless encoding method and a lossy encoding method.

In the former case, there is a one-to-one correspondence between the image and the code, and no deterioration of image quality occurs in decoding, but there is a problem that the control of the code amount is difficult. For example, according to Shannon's theorem of information source encoding, it is impossible to make an average code length smaller than the entropy (see, for example, "A guide for document data compressing algorithm", T. Uematsu, CQ publishing company, pp. 32–33). Consequently, in the case where the code amount is limited by some restrictions, it is required to positively reduce the amount of necessary information of the image itself. This is the lossy encoding method.

Here, the entropy is described. The entropy is the sum of the expected values of the information amount outputted per each of the symbols outputted from an information source from which an event occurs randomly and independently of the other events, and defined by the following relation.

$$H = -\Sigma P(ai) \log_2 P(ai) \quad (1)$$

$P(ai)$ represents an occurrence rate of i-th symbol $ai$, and $\Sigma$ represents the sum of all symbols. Next, the entropy is calculated by using the specific example shown in FIG. 7. In the figure, there are 6 symbols $a1-a6$ and the sum of the number of times of occurrence is 24. The result of calculation of the entropy by utilizing the relation (1) is 2.418 bits. According to Shannon's theorem of information source encoding, it is impossible to make the average code length not more than 2.418 bits. In other words, since the sum of the number of times of symbol occurrence is 24, the bit number not less than 2.418×24=58.03 is at least required for representation of the symbol string shown in FIG. 7. In the figure, a result of calculation of the average code length by utilizing code words actually assigned is 2.5 bits; accordingly, it is necessary to have 2.5×24=60 bits for representation of the symbol string.

Next, the predictive encoding of the lossless encoding method is described. The predictive encoding is a technique for predicting the value of an object pixel based on the states of neighboring pixels which have been processed, and if the prediction results in failure, the prediction error is regarded as a code. The prediction error is a difference between the values of the object pixel and the neighboring pixel, which is obtained by the following relation, for example.

$$d = X - A \quad (2)$$

Here, $d$, $X$ and $A$ represent the values of the prediction error, object pixel and neighboring pixel, respectively.

In the predictive encoding, the size and distribution of the prediction error have an influence on the code amount. For example, in an image without noise rendered by a page description language (abbreviated as PDL), the code amount is small. In contrast, in a scanned-in image having noise, the code amount is large.

Now, a method of predictive encoding (Japanese Patent Application No. 8-31074) proposed by the inventors of the present invention is described as an example.

FIG. 8(a) and 8(b) are block diagrams showing constructions of the encoding apparatus and decoding apparatus disclosed in Japanese Patent Application No. 8-31074.

The encoding apparatus shown in FIG. 8(a) is constructed as follows. An image inputting element 10 receives inputted image information from the outside, and forwards it to a first prediction element 20, a second prediction element 21 and a prediction error calculating element 30 as image data 100. Each of the first prediction element 20 and the second prediction element 21 predicts the pixel value of an object pixel based on the image data 100 according to each predetermined manner, and forwards it to a selecting element 40 as predicted value data 110. A prediction error calculating element 30 predicts the pixel value of the object pixel based on the image data 100 according to the predetermined manner and calculates the difference between the predicted value and an actual value of the object pixel, and then forwards the difference to the selecting element 40 as prediction error data 120. The selecting element 40 examines whether the prediction as to the object pixel succeeds or fails based on the image data 100 and the predicted value data 110. As a result, if there is any prediction element which succeeds in prediction, an identification number of the element is converted into prediction state data 130 and forwarded to an encoding element 50. If no prediction element succeeds in prediction, the prediction error data 120 is converted into the prediction state data 130 and then forwarded to the encoding element 50. The encoding element 50 executes encoding of the prediction state data 130 to generate code data 140 by utilizing a predetermined encoding manner, and forwards it to a code outputting element 60. The code outputting element 60 outputs the code data 140 to the outside as output code.

Each part of the decoding apparatus shown in FIG. 8(b) is described next. Elements corresponding to elements of the encoding apparatus have the same reference numbers as those of the encoding apparatus, and explanations are omitted. A code inputting element 70 receives an inputted code from the outside, and forwards it to a decoding element 51 as the code data 140. The decoding element 51 decodes the code data 140 by a decoding manner which is a counterpart of the encoding manner used in the encoding element 50, and forwards it to a selecting element 41 as the prediction state data 130. If the prediction state data 130 indicates an identification number of a prediction element, the selecting element 41 forwards control data 111 to the relevant prediction element so that the prediction element outputs image data 100. If the content of the prediction state data 130 is the prediction error, the selecting element 41 forwards it to a prediction error adding element 31 as the prediction error data 120. The prediction error adding element 31 predicts the pixel value of the object pixel by the manner same as that of the prediction error calculating element 30, restores the pixel value based on the predicted value and the prediction error data 120, and forwards it to an image outputting element 80 as the image data 100. Then the image outputting element 80 outputs the image data 100 to the outside as a decoded image.

Operations according to the encoding manner and decoding manner with the above constructions are now described. FIG. 9(a) and 9(b) are flow charts showing the operations.

Encoding operations are explained first based on FIG. 9(a). In step 10, an image is inputted to the image inputting element 10 to obtain the image data 100. In step 20, the pixel value prediction of the object pixel is performed in the first prediction element 20 and the second prediction element 21 based on the image data 100, and at the same time, the prediction error of the predicted value is calculated by a predetermined manner in the prediction error calculating element 30.

In step 30, it is determined in the selecting element 40 whether the predicted value of the first prediction element is identical with the pixel value of the object pixel. If these two values are identical, the identification number of the prediction element which succeeded in prediction is converted into the prediction state data 130 and forwarded to the encoding element 50. If these values are not identical, it is determined whether the predicted value of the second prediction element is identical with the pixel value of the object pixel, and if these values are identical, the identification number of the prediction element which succeeded in prediction is converted into the prediction state data 130 and forwarded to the encoding element 50. If two values are not identical, the prediction error data 120 is converted into the prediction state data 130 and forwarded to the encoding element 50.

In step 40, the prediction state data 130 is encoded in the encoding element 50 by a predetermined encoding manner to obtain the code data 140. In step 50, the code outputting element 60 outputs the code data 140 to the outside. In step 60, it is determined whether all pieces of inputted image data have been processed, and if processing of all pieces of data has been completed, the encoding process is finished. If there is any data left unprocessed, the process returns to the step 10.

Next, decoding operations are described based on FIG. 9(b). In step 110, the code is inputted to the code inputting element 70 to obtain the code data 140. In step 120, in the decoding element 51, the prediction state data 130 is obtained from the code data 140 by utilizing a decoding manner which is a counterpart of the encoding manner used in the encoding element 50.

In step 130, it is determined in the selecting element 41 whether the prediction state data 130 is identical with the identification number of the first prediction element. If these values are identical with each other, the control data 111 is forwarded to the first prediction element 20. If these values are not identical, it is determined whether the prediction state data 130 is identical with the identification number of the second prediction element. If these values are identical with each other, the control data 111 is forwarded to the second prediction element 21. In the case where these values are not identical, the prediction state data 130 is converted into the prediction error data 120 in the selecting element 41, and forwarded to the prediction error adding element 31.

In step 21, if there is any prediction element which receives the control data 111, the relevant prediction element outputs the value of the object pixel predicted by itself as the image data 100. In the case where no prediction element receives the control data 111, the pixel value is restored in the prediction error adding element 31 based on the prediction error data 120 and the predicted value obtained by the manner same as that of the prediction error calculating element 30, and outputted as the image data 100. In step 140, the image outputting element 80 outputs the image data 100 to the outside. In step 150, it is determined whether all inputted code data are processed, and if all data have been processed, the decoding process is finished. In the case there are the data left unprocessed, the process returns to step 110.

In the encoding apparatus and decoding apparatus with the above constructions, the size and the distribution of the prediction error influence the code amount as described so far. FIG. 10 shows examples of distribution of prediction error in two images, one of which is rendered by PostScript (trademark of Adobe Systems Incorporated), a kind of the PDLs, and the other one is a scanned-in image. The image rendered by PostScript has no noise; accordingly, the object pixel and the neighboring pixel is closely correlated, and as a result, the distribution of prediction errors is locally biased around zero as shown in FIG. 10. In this case, the entropy calculated by the relation (1) by utilizing the prediction error represented by the relation (2) becomes small, and thereby the code amount can be reduced. In contrast, the scanned-in image has some noise and the object pixel and the neighboring pixel has correlation of low level; therefore, the distribution of prediction errors is less biased around zero as shown in FIG. 10. The result of entropy calculation using the prediction error represented by the relation (2) is large, whereby the code amount also becomes large. In the example of Japanese Patent Application No. 8-31074, the code amount of the image having close correlation between the object pixel and the neighboring pixel, such as an image rendered by PDL, is effectively reduced.

However, as the inputted image information, there is a tag as well as the pixel values such as the image rendered by the PDL or the scanned-in image. The tag is the additional information about the output image, which indicates, for example, switching of the image rendered by the PDL and that inputted by scanning, switching of encoding method, switching of resolution, or the like. The bit number of the pixel value is 8 bits, for example, whereas the bit number of the tag is 1 bit or more. In many cases, the bit number of the tag is smaller than that of the pixel value. For instance, the tag indicating switching of an image rendered by the PDL and a scanned-in image requires 1 bit, and the tag indicating switching of the encoding methods or resolutions requires 1–3 bits.

In the case where a tag having a bit number smaller than that of a pixel value is encoded by utilizing the encoding method disclosed in Japanese Patent Application No. 8-31074, the compressing efficiency is lower than that of the pixel value. For example, it is assumed that the pixel value has 8 bits, the tag has 1 bit and the predicted value data 110 of FIG. 8 has 2 bits. Supposing that the prediction is succeeded, 8 bits of the pixel value is reduced to 2 bits, and the amount of data is reduced to ¼. In the case of tag, 1 bit increases to 2 bits, and thereby the amount of data becomes larger.

Therefore, if the bit number of the tag is smaller than that of the pixel value, it may be possible to carry out packing so that the bit number of the tag becomes equal to that of the pixel value, and then the tag is encoded. Thus the data amount in the case the prediction is succeeded is the same in both of the cases of the pixel value and the tag.

Next is the case where the prediction fails. In the example of Japanese Patent Application No. 8-31074, the prediction error data 120 is generated by the difference between the predicted value and the actual value of the object pixel if the prediction fails, as described above. The reason for taking the difference is that each of the bits constituting the pixel has no significance, but the value of 8 bits as a whole has significance as a pixel value, and moreover, the correlation exists between the pixels. To the contrary, the tag packed to unit data having 8 bits (hereinafter, this is simply referred to as the tag) has significance in each of the bits constituting the tag in this example, and there is little significance as a value of 8 bits as a whole. The correlation between each of the bits constituting the tag is closer than that between the tags. Accordingly, in the case where the prediction fails, the information indicating how many different bits a couple of tags have is more significant than the information obtained by the difference between the tags.

As an operation satisfying such conditions, exclusive OR can be considered, for example. The exclusive OR is a bit operation which outputs 0 if two factors have the same value, or outputs 1 if two factors have different values. Consequently, in some cases, generation of the prediction error data 120 using the exclusive OR, rather than using the difference leads to closer correlation between the tags and the reduction of the code amount dependent on the type of the tag.

As described above, in the case where the inputted image information is other than the pixel value and has a bit number smaller than the pixel value, such as a tag, and besides the prediction fails, generation of the prediction error data 120 based on the difference as disclosed in Japanese Patent Application No. 8-31074 reduces correlation between the pieces of inputted image information, and therefore the code amount cannot be reduced.

SUMMARY OF THE INVENTION

The present invention has been made in view of the above circumstances and has an object to provide an image encoding/decoding apparatus capable of efficiently compressing inputted image information even though the information has the bit number smaller than that of a pixel value, such as a tag.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims. To achieve the objects and in accordance with the purpose of the invention, as embodied and broadly described herein, an image encoding apparatus of the present invention which performs lossless encoding, comprises an image inputting element for inputting image information, packing element for packing the image information inputted through the image inputting element in unit data of a fixed length, plural pixel value predicting elements, each of which predicts a value of the unit data outputted from the packing element by a predetermined manner, plural prediction error calculating elements, each of which calculates a prediction error between the value of the unit data outputted from the packing element and the value predicted by a corresponding one of the plural pixel value predicting elements, a prediction error selecting element for selecting an optimum prediction error from the prediction errors outputted from the plural prediction error calculating elements, a selecting element for selecting identification information of one of the plural pixel value predicting elements which succeeds in prediction, and in the case where no pixel value predicting element succeeds in prediction, selecting the prediction error selected by the prediction error selecting element, an encoding element for encoding the identification information or the prediction error selected by the selecting element by a predetermined manner, and a code outputting element for outputting the code generated by the encoding element.

With the above construction, even if the image information is not the pixel value information but the information having smaller bit number such as a tag, the data can be compressed by packing. Moreover, it is possible to provide plural prediction error calculating elements so as to adopt a prediction error suited for characteristics of each image information, and thereby the compression rate can be improved.

Additionally, with the above construction, the prediction error selecting element may select and output unit data sent from the packing element as the prediction error if the unit data itself is more appropriate than the prediction error outputted by the prediction error calculating element. Thus, in the case where the unit data itself has the compression rate higher than that of the prediction error, the unit data itself may be forwarded.

The operation carried out for obtaining the prediction error in the prediction error calculating element is subtraction or exclusive OR.

The apparatus may also be constructed so that a selection signal can be inputted to the prediction error selecting element from the outside of a body of the apparatus and in accordance with the signal, the unit data inputted from the packing element is outputted from the prediction error selecting element as the prediction error.

Furthermore, the prediction error selecting element may be made to comprise an entropy calculating element for calculating an entropy of unit data inputted from the packing element and each of prediction errors of the plural prediction error calculating elements by predetermined procedures, a selection signal generating element for selecting a smallest entropy from those calculated by the entropy calculating element and generating a relevant selection signal, and an element for selecting a desirable one from any of the unit data inputted from the packing element and prediction errors of the plural prediction error calculating elements according to the selection signal.

An image decoding apparatus of the present invention, which decodes image information encoded by an image encoding apparatus such as that described above, comprises a code inputting element for inputting code encoded by the image encoding apparatus, a decoding element for decoding the code inputted through the code inputting element by a predetermined manner, a selecting element for outputting a direction to one of plural predicting elements or a prediction error in accordance with information obtained by the decoding element, each of the plural predicting elements predicting a value of the unit data inputted through the code inputting element in accordance with a direction from the selecting element, plural prediction error adding elements, each of which calculates a value of unit data based on the prediction error sent from the selecting element and a predicted value predicted by a predetermined manner, a predicted value selecting element for selecting an optimum predicted value from those calculated by the plural prediction error adding elements, an unpacking element for unpacking the unit data outputted from one of the predicting elements and predicted value selecting element by a predetermined manner to restore the image information, and an image outputting element for outputting the image information sent from the unpacking element.

With this construction, it is possible to decode the image information efficiently compressed by the image encoding apparatus.

With the above construction, the predicted value selecting element may select and output the prediction error sent from the selecting element as a predicted value if the prediction error is more appropriate than the predicted value outputted by the prediction error calculating element.

In the prediction error adding element, the operation carried out for obtaining the value of the object pixel may be addition or exclusive OR.

The apparatus may also be constructed so that the selection signal can be inputted to the predicted value selecting element from the outside of a body of the image information decoding apparatus, and the desirable one can be selected from any of the prediction error sent from the selecting element and the values of the object pixel calculated by the plural prediction error adding elements according to the selection signal.

Furthermore, the predicted value selecting element may be constructed to have plural prediction error calculating elements each of which calculates error between the data outputted by the prediction element or the predicted value selecting element and a predicted value obtained by a predetermined method, an entropy calculating element for calculating an entropy of data outputted from the prediction element or the predicted value selecting element and the prediction errors of the plural prediction error calculating elements, a selection signal generating element for selecting a smallest entropy from those calculated by the entropy calculating element and generating a relevant selection signal, and an element for selecting a desirable one from the prediction error sent from the selecting element and the predicted values calculated by the plural prediction error adding elements according to the selection signal.

BRIEF DESCRIPTION OF THE DRAWINGS

The accompanying drawings, which are incorporated in and constitute a part of this specification illustrate an embodiment of the invention, and, together with the description, serve to explain the objects, advantages and principles of the invention. In the drawings:

FIG. 2(a) is a flow chart showing an example of operation of the embodiment of the image encoding apparatus;

FIG. 2(b) is a flow chart showing an example of operation of the embodiment of the image decoding apparatus;

FIG. 6(a) shows an example of the case where exclusive OR is effective;

FIG. 6(b) shows an example of the case where subtraction is effective;

FIG. 7 illustrates the entropy;

DETAILED DESCRIPTION OF THE PREFERRED EMBODIMENT

A preferred embodiment of an image encoding apparatus and an image decoding apparatus according to the present invention is now described in detail based on the drawings.

First Embodiment

Figure 1A:
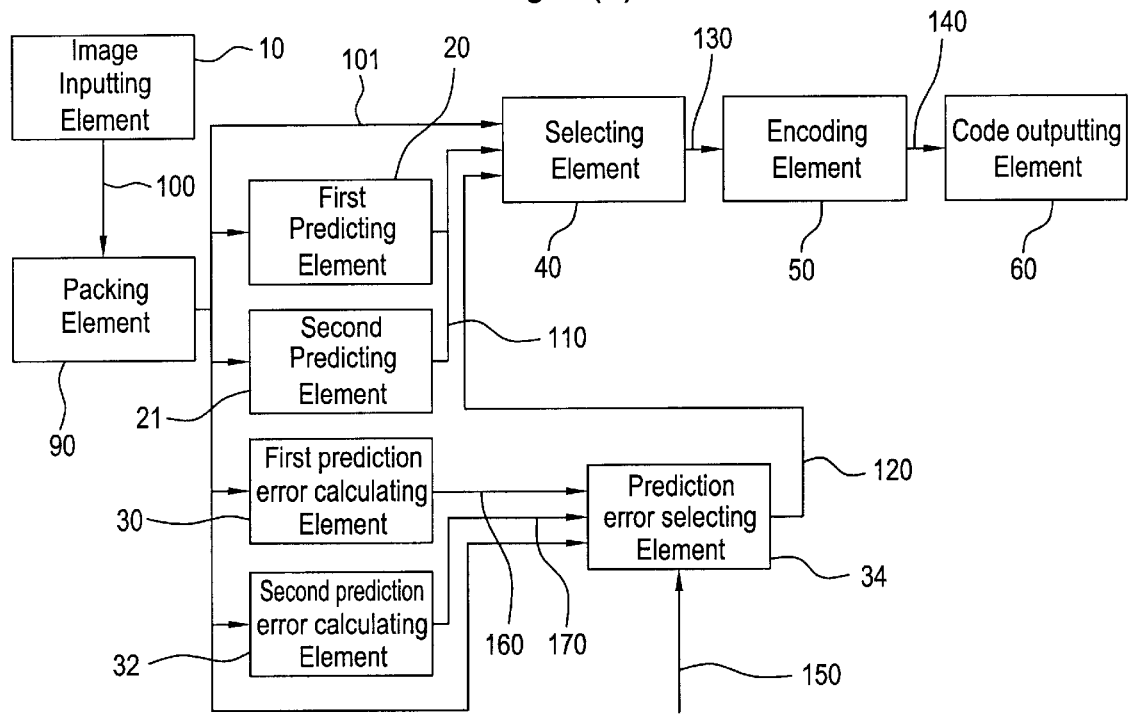
FIG. 1(a) shows an embodiment of an image encoding apparatus according to the present invention.
Figure 1B:
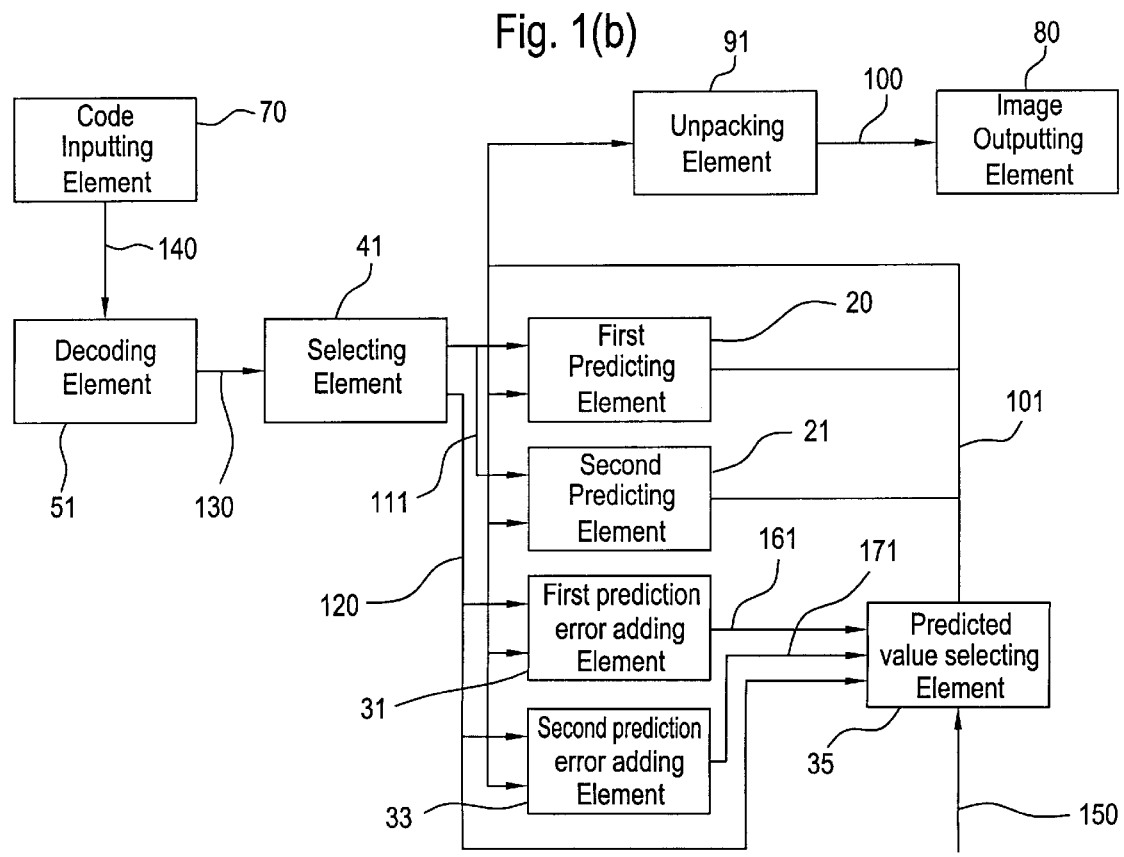
FIG. 1(b) shows an embodiment of an image decoding apparatus according to the present invention.
Figure 8A:
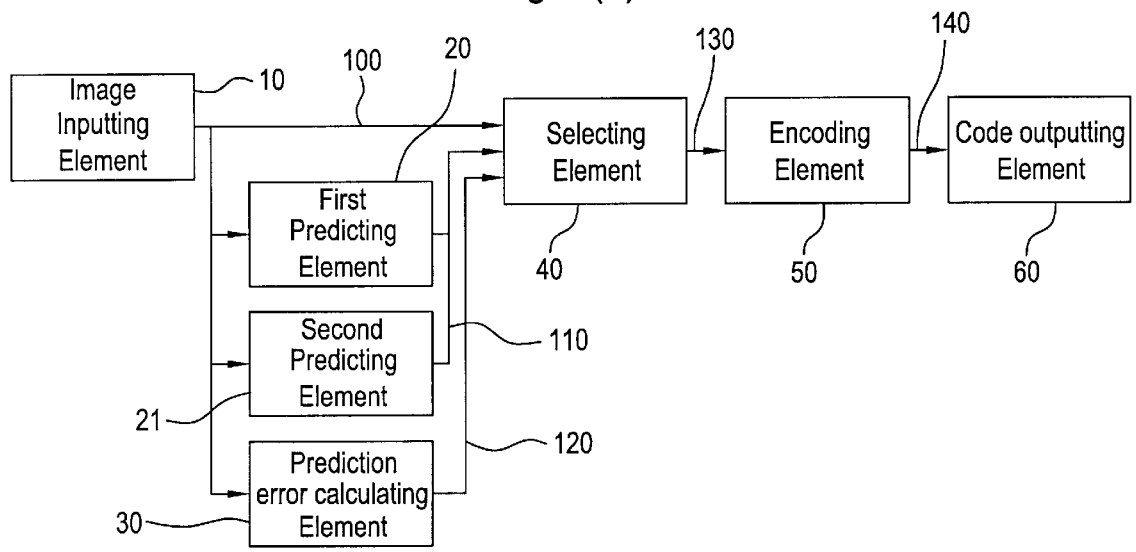
FIG. 8(a) shows the construction of an image encoding apparatus according to a prior art.
Figure 8B:
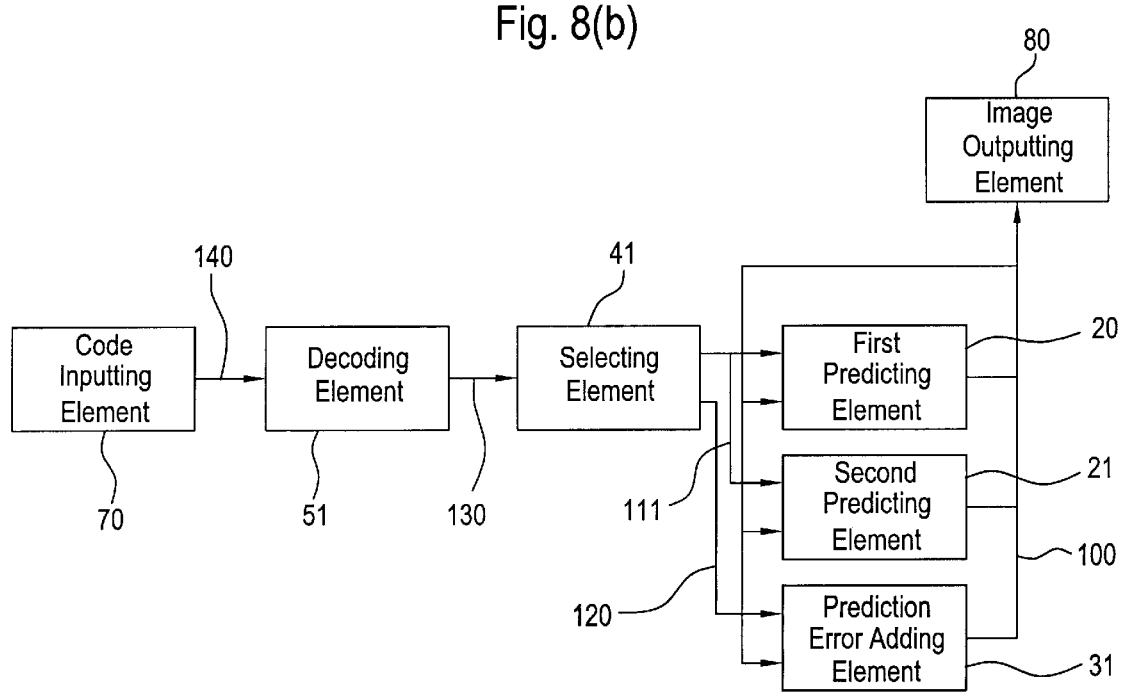
FIG. 8(b) shows the construction of an image decoding apparatus according to a prior art.

FIGS. 1(a) and 1(b) are block diagrams showing a first embodiment of an image encoding apparatus and an image decoding apparatus, respectively, according to the present invention. Elements corresponding to the elements shown in FIGS. 8(a) and 8(b) have the same reference numbers as those shown in FIGS. 8(a) and 8(b), and explanations thereof are omitted.

First, the image encoding apparatus is described.

In FIG. 1(a), a packing element 90 packs image data 100 into data of a certain fixed length by a predetermined method and forwards the data as packed image data 101. A second prediction error calculating element 32 predicts a pixel value of an object pixel based on the packed image data 101, performs an operation other than subtraction (for example, exclusive OR) using the predicted value and an actual pixel value to obtain prediction error data 170, and forwards it to a prediction error selecting element 34. The prediction error selecting element 34 selects one from any of the prediction error data 160 from the first prediction error calculating element 30, the prediction error data 170 from the second prediction error calculating element 32, and the packed image data 101 in accordance with the external selection signal 150, and outputs the selected data as prediction error data 120. Otherwise, it is possible to calculate, for example, an entropy for each of the prediction error data 160 from the first prediction error calculating element 30, the prediction error data 170 from the second prediction error calculating element 32 and the packed image data 101, and select the data having the smallest entropy to output as the prediction error data 120.

Operations of the image encoding apparatus in this embodiment are described as follows. FIG. 2(a) is a flow chart showing the operations of the image encoding apparatus. The basic operations are the same as those of the example of Japanese Patent Application No. 8-31074 which have been explained based on FIG. 9(a); therefore, only the operations different from those of the example of Japanese Patent Application No. 8-31074 are explained.

In step 15, the image data 100 is packed into data of a certain fixed length by a predetermined method to obtain the packed image data 101. For example, if it is assumed that the fixed length for packing is the bit number of the pixel value, the image data 100 is directly regarded as the packed image data in the case where the image data 100 is the pixel value. If the bit number of the image data 100 is less than that of the pixel value, i.e., if the image data 100 is a tag, it is packed to generate the packed image data 101.

Figure 9A:
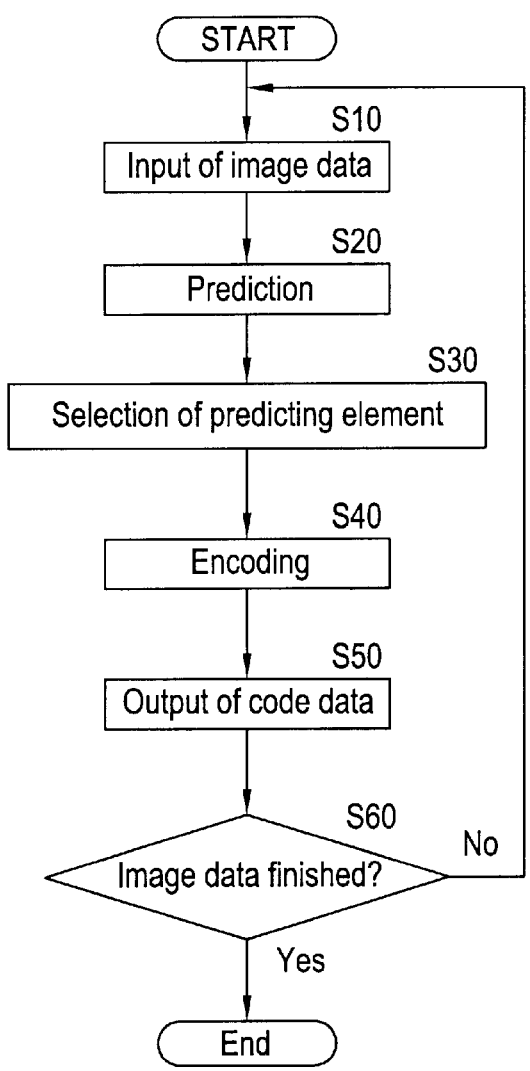
FIG. 9(a) is a flow chart showing an example of operation of the image encoding apparatus according to the prior art.

In the example of Japanese Patent Application No. 8-31074, the first prediction error calculating element 20 and the second prediction error calculating element 21 execute pixel value prediction of an object pixel based on the image data 100 in step 20 of FIG. 9(a), and at the same time, the prediction error of the predicted value is calculated by the predetermined manner in the prediction error calculating element 30. In this embodiment, the packed image data 101 is used instead of the image data 100, and in addition to the example of Japanese Patent Application No. 8-31074, a prediction error of the predicted value is calculated by a predetermined manner in the second prediction error calculating element 32. Further, the desirable data is selected from any of the prediction error obtained by the first prediction error calculating element 30, the prediction error obtained by the second prediction error calculating element 32 and the packed image data 101, and forwarded as the prediction error data 120 to the selecting element 40.

Figure 3A:
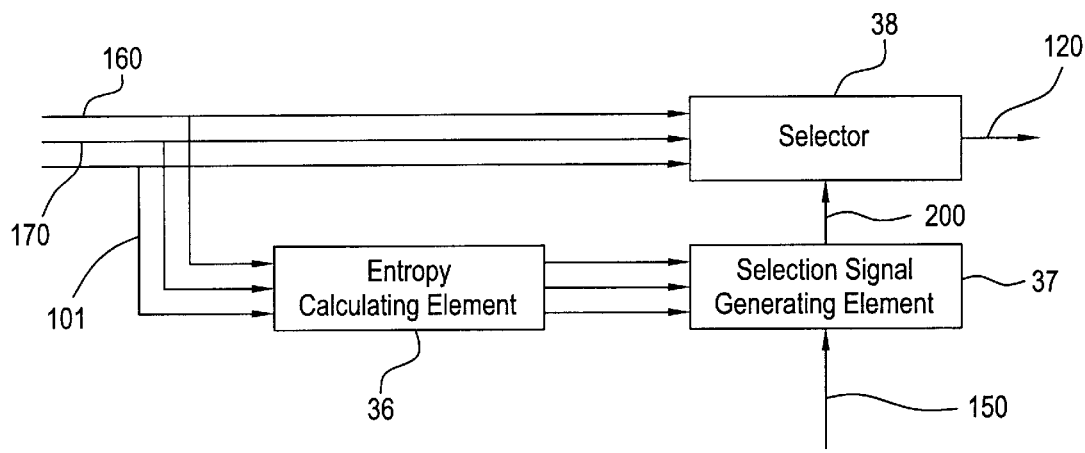
FIG. 3(a) is a block diagram showing the construction of a prediction error selecting element of the embodiment of the image encoding apparatus.

Next, the details of the prediction error selecting element 34 are described as follows. FIG. 3(a) is a block diagram showing the construction of the prediction error selecting element of this embodiment of the image encoding apparatus according to the present invention. In the figure, an entropy calculating element 36 calculates the occurrence rate of a determined number of samples (for example, assumed to be N) for each of the prediction error data 160 from the first prediction error calculating element 30, the prediction error 170 from the second prediction error calculating element 32, and the packed image data 101, and calculates each entropy and outputs it to the selection signal generating element 37. If the external selection signal 150 is activated, the selection signal generation element 37 forwards the external selection signal 150 to the selector 38 as the selection signal 200. To the contrary, if the external selection signal is inactivated, the smallest entropy is selected from those of the prediction error data 160 from the first prediction error calculating element 30, the prediction error data 170 from the second prediction error calculating element 32 and the packed image data 101, and the selection signal corresponding to the selected smallest entropy is forwarded to the selector 38. The selector 38 selects the desirable data from any of the prediction error data 160 from the first prediction error calculating element 30, the prediction error data 170 from the second prediction error calculating element 32 and the packed image data 101 by utilizing the selection signal 200.

Figure 4A:
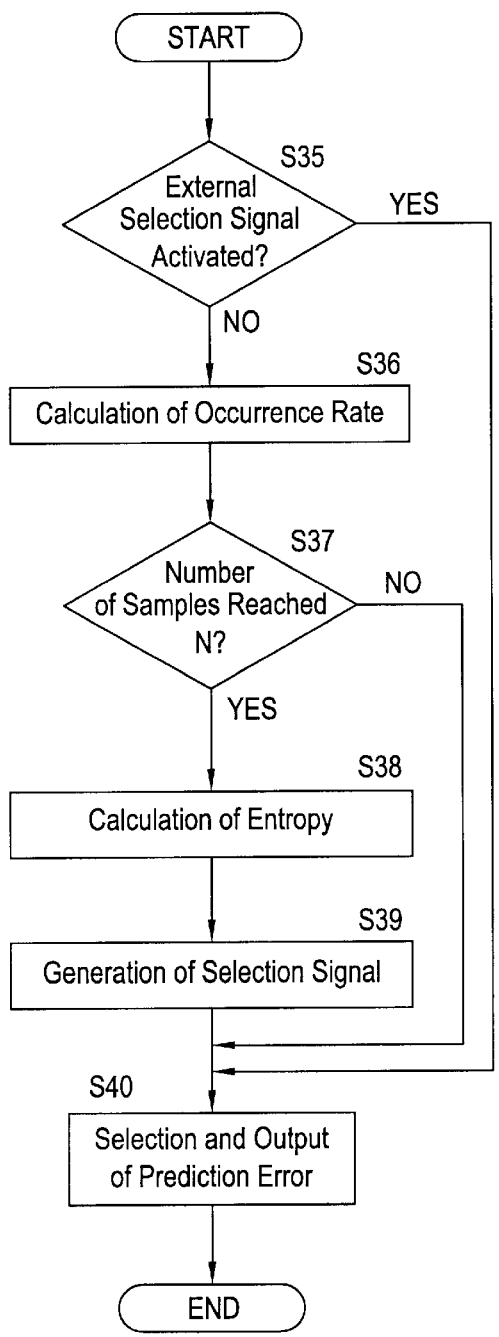
FIG. 4(a) is a flow chart showing an example of operation of the prediction error selecting element of the embodiment of the image encoding apparatus.

Next, operations of the prediction error selecting element 34 are explained. FIG. 4(a) is a flow chart showing the operations of the prediction error selecting element 34. In the figure, a maximum value of the number of samples for calculating the entropy is set for starting the operation. The number of samples provides the interval of switching of the selection signal, and to avoid the contradiction between the operations of the image encoding apparatus and the image decoding apparatus. Now it is assumed that the maximum number of samples is N. A counter for the number of samples (now referred to as a sample counter) is reset to 0. Then the prediction error data is inputted to start the operations. In step 35, it is determined whether the external selection signal 150 is activated, and if the signal is activated, the process proceeds to step 40, and if the signal is inactivated, the process proceeds to step 36. In step 36, the occurrence rate is calculated for each of the values of the prediction error data 160 obtained by the first prediction error calculating element 30, the prediction error data 170 obtained by the second prediction error calculating element 32 and the packed image data 101, and at the same time, the value of the sample counter is incremented. In step 37, it is determined whether the value of the sample counter has reached N or not, and if the value has reached N, the process proceeds to step 38, and if the value has not reached N yet, the process proceeds to step 40. In step 38, the entropy is calculated for each of the prediction error data 160 obtained by the first prediction error calculating element 30, the prediction error data 170 obtained by the second prediction error calculating element 32, and the packed image data 101. In step 39, the smallest entropy is selected from those for each of the prediction error data 160 obtained by the first prediction error calculating element 160, the prediction error data 170 obtained by the second prediction error calculating element 170 and the packed image data 101, and the selection signal 200 corresponding thereto is generated and forwarded to the selector 38. Then the sample counter is reset to 0. In step 40, the desirable data is selected from the prediction error data 160 obtained by the first prediction error calculating element 30, the prediction error data 170 obtained by the second prediction error calculating element 32, and the packed image data 101 by utilizing the selection signal 200, and forwarded as the prediction error data 120 to the selecting element 40.

Next, the image decoding apparatus in this embodiment is explained. In FIG. 1(b), a second prediction error adding element 33 predicts the pixel value of an object pixel by the manner as same as that of the second prediction error calculating element 32, restores the pixel value based on the predicted value and the prediction error data 120, and forwards the value to the predicted value selecting element 35 as image data 171. The predicted value selecting element 35 selects one of the image data to be decoded 161 obtained by the first prediction error adding element 31, which is substantially the same as the prediction error adding element 30 shown in FIG. 8(b), the image data to be decoded 171 obtained by the second prediction error adding element 33 and the prediction error data 120 in accordance with the external selection signal 150, and outputs it as the packed image data 101. Or, for example, the entropy is calculated by a method as same as that of the image encoding apparatus using the packed image data 101, and the smallest entropy is selected from those for each of the image data to be decoded 161 obtained by the first prediction error adding element 31, the image data to be decoded 171 obtained by the second prediction error adding element 33 and the prediction error data 120 to be outputted as the packed image data 101. An unpacking element 91 unpacks the packed image data 101 by a predetermined manner which is the counterpart of that of the packing element 90 to generate the image data 100 and forwards it.

Operations of the embodiment of the image decoding apparatus are described as follows. FIG. 2(b) is a flow chart showing the operations of the embodiment of the image decoding apparatus. The basic operations of the embodiment of the image decoding apparatus is almost the same as those proposed in Japanese Patent Application No. 8-31074 which have been explained based on FIG. 9(b); consequently, only the different operations will be described.

Figure 9B:
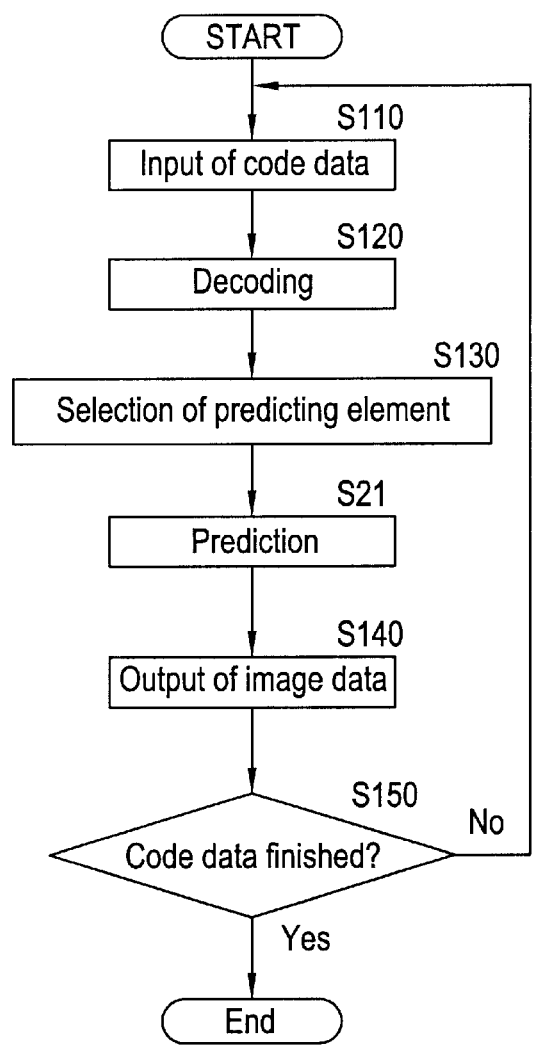
FIG. 9(b) is a flow chart showing an example of operation of the image decoding apparatus according to the prior art.
Figure 10:
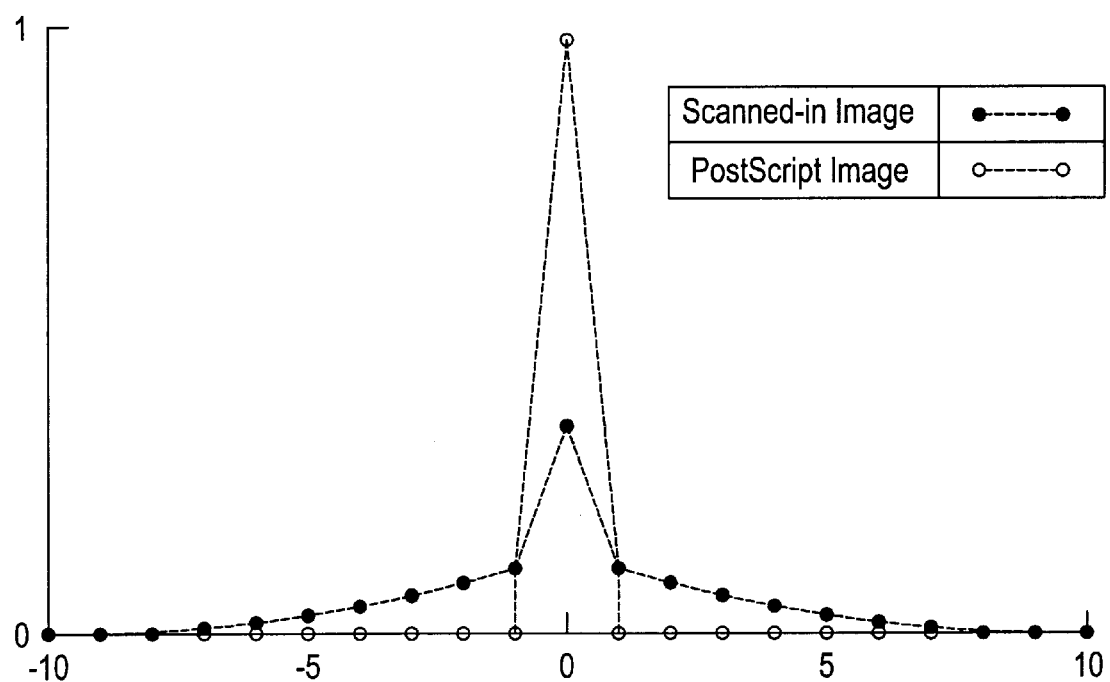
FIG. 10 illustrates the distribution of prediction errors.

In the decoding process of Japanese Patent Application No. 8-31074, if there has been any prediction element which received the control data 111 in step 21 of FIG. 9(b), the relevant prediction element outputs the value of the object pixel predicted by itself as the image data 100. In other cases, the prediction error adding element 31 restores the pixel value from the prediction error data 120 and the predicted value by the method as same as that of the prediction error calculating element 30, and outputs it as the image data 100.

In this embodiment, in the case there is any prediction element which has received the control data 111, the processes to be executed are the same as those of Japanese Patent Application No. 8-31074, but if there is no prediction element which has received the control data, the processes to be executed are as follows. The first prediction error adding element 31 predicts the pixel value of the object pixel by the manner the same as that of the first prediction error calculating element 30 and restores the pixel value based on the predicted value and the prediction error data 120. The second prediction error adding element 33 predicts the pixel value of the object pixel by the manner the same as that of the second prediction error calculating element 32 and restores the pixel value based on the predicted value and the prediction error data 120. Among the three pieces of data, namely, the prediction error data 120 in addition to the two pieces of image data which have been restored, the desirable data is selected and outputted as the packed image data 101.

In step 135, the packed image data 101 is unpacked by a predetermined manner which is the counterpart of the manner in step 15 to obtain the image data 100.

Figure 3B:
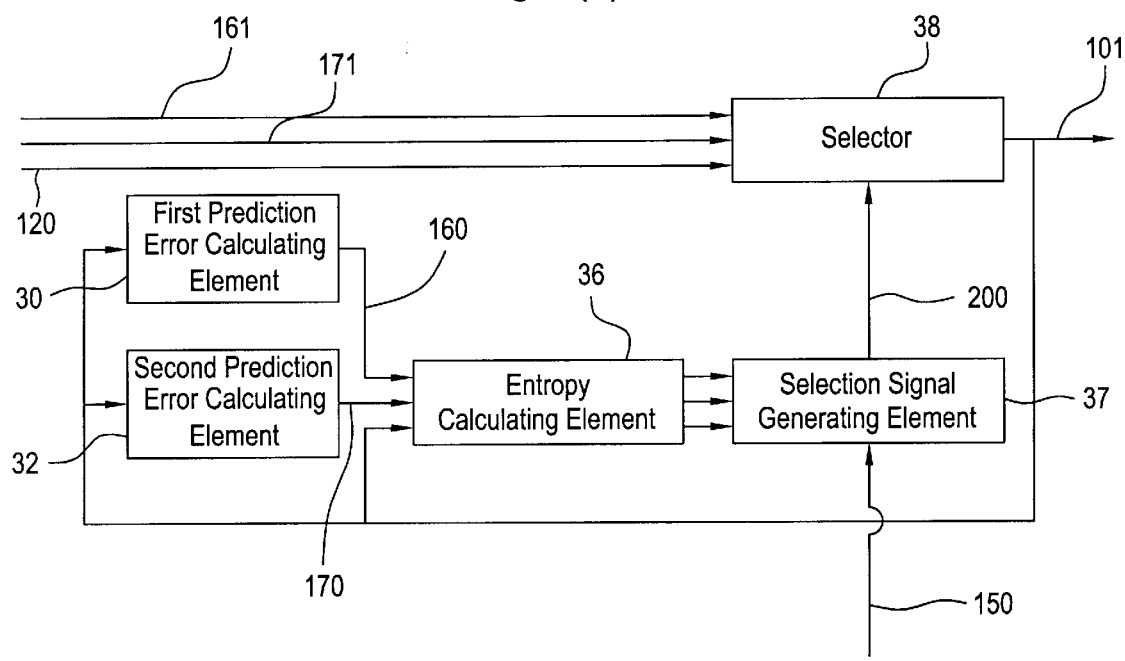
FIG. 3(b) is a block diagram showing the construction of a predicted value selecting element of the embodiment of the image encoding apparatus.

Next, the predicted value selecting element 35 is described in detail. FIG. 3(b) is a block diagram showing the construction of the predicted value selecting element of the image decoding apparatus of the present invention. In the figure, all of the elements have already been described, and therefore explanations are omitted here.

Figure 4B:
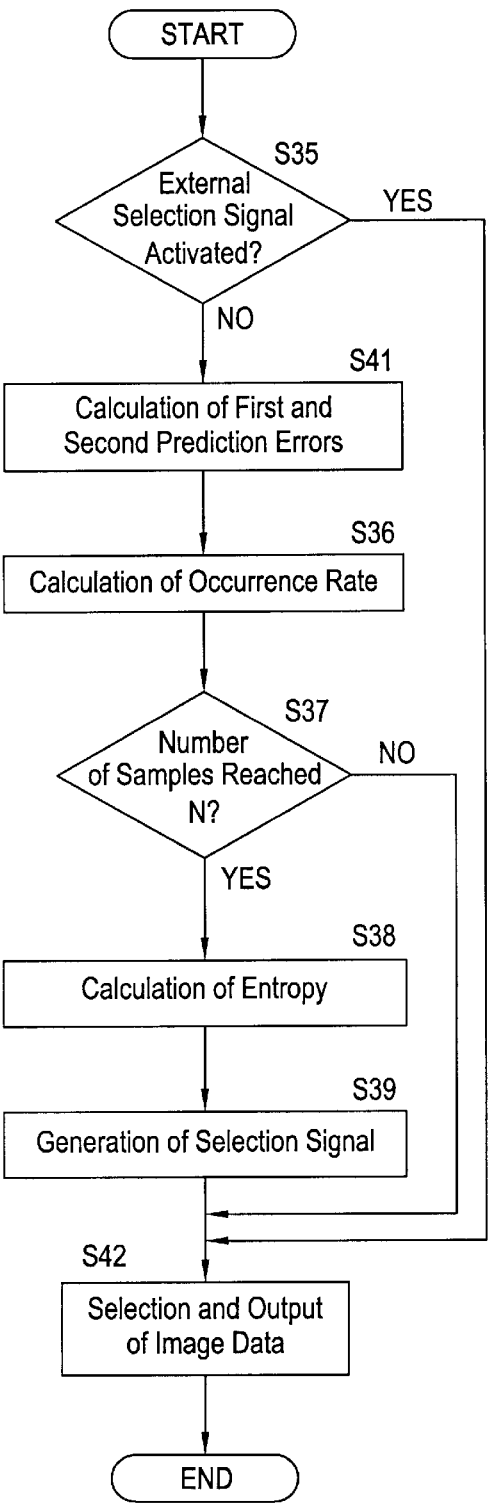
FIG. 4(b) is a flow chart showing an example of operation of the predicted value selecting element of the embodiment of the image decoding apparatus.

Operations of the predicted value selecting element 35 are now described. FIG. 4(b) is a flow chart showing the operations of the predicted value selecting element 35. In FIG. 4(b), steps corresponding to steps of FIG. 4(a) have the same reference numbers as those of FIG. 4(a), and the explanations are omitted. In step 41, the pixel value of the object pixel is predicted based on the packed image data 101 by a predetermined method, and the difference between the predicted value and the actual value of the object pixel is calculated to be forwarded to the entropy calculating element 36 as the prediction error data 160. At the same time, the pixel value of the object pixel is predicted based on the packed image data 101 by a predetermined method, and an operation other than subtraction (for example, exclusive OR) is performed by using the predicted value and the actual pixel value of the object pixel, and the result of the operation is forwarded to the entropy calculating element 36 as the prediction error data 170. In step 42, the desirable data is selected from the image data 161 obtained by the first prediction error adding element 31, the image data 171 obtained by the second prediction error adding element 33 and the prediction error data 120 in accordance with the selection signal 200, and the selected data is forwarded to the unpacking element 91 as the packed image data 101.

Effectiveness of operations in this embodiment is explained. The image decoding apparatus executes the reverse operations of the image encoding apparatus; therefore, the effectiveness thereof is the same as that of the image encoding apparatus. Thus only the explanation as to the image encoding apparatus is provided.

In this embodiment, two elements for calculating the prediction error are newly added so that the prediction error having the smallest entropy is selected from three pieces of data and outputted as the prediction error for trying to reduce the code amount. One of the prediction error is calculated by subtraction, another is calculated by an operation other than subtraction, for example, exclusive OR, and the other is the image data itself without being operated upon. Actually, execution of subtraction and exclusive OR is remarkably effective; consequently, the cases where subtraction and exclusive OR are effective, respectively, are now described in detail.

Figure 5:
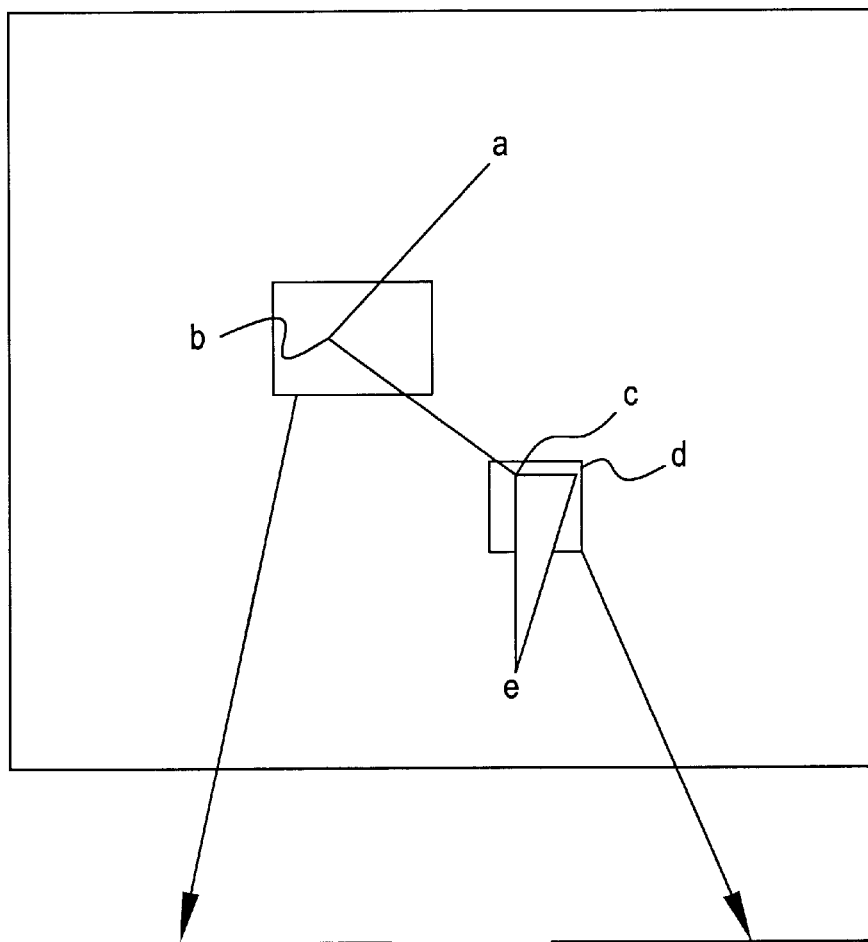
FIG. 5 illustrates an example of tag which represents different resolutions.

FIG. 5 shows an example of a tag representing different resolutions. In the figure, each of a, b and c represents the end point of the straight line and each of c, d and e represents the vertex of a triangle. It is assumed, for example, that the straight lines ab, bc and the inside of the triangle cde (including the sides) are rendered with the resolution of 400 dots/25.4 mm, and the other portions are rendered with the resolution of 200 dots/25.4 mm. The tag representing the difference of resolution is assumed to be of 1 bit: for example, the resolution of 400 dots/25.4 mm is represented by 1 and the resolution of 200 dots/25.4 mm is represented by 0. The periphery of the end point b is now expanded and represented by T1, T2, T3, T4 and T5. Similarly, the periphery of the vertexes c and d is expanded and represented by T6, T7, T8, T9 and T10.

FIG. 6(a) and FIG. 6(b) show the example in which exclusive OR is effective and the example in which subtraction is effective, respectively, based on FIG. 5. Here, it is assumed that the operation has 8 bits, subtraction is represented by a symbol sub and exclusive OR is represented by a symbol xor.

First, the case in which exclusive OR is effective is explained. The exclusive OR is a bit operation which generates 0 if two factors have the same values, and generates 1 if the two factors have different values. Subtraction is an incommutative operation, whereas exclusive OR is a commutative operation. That is, $$A \text{ xor } B = B \text{ xor } A \qquad (3)$$

This characteristic is shown in FIG. 6(a), which is an example of effectiveness of exclusive OR. T3 is an 8-bit register having the value 16, T2 and T4 are 8-bit registers having the value 8. According to the relation (3), results of two operations (T2 xor T3 and T3 xor T4) are the same value. This means that the distribution of the operation result is locally biased, and thereby the entropy becomes smaller and the code amount can be reduced. In contrast, results of the subtraction operations in this example are: T2 sub T3=−8 (which is the case of operation with the plus or minus sign. In the case of the operation without the plus or minus sign, T2 sub T3=248.), and T3 sub T4=8. Thus the bias does not occur in the distribution of the operation results.

Another advantage of the exclusive OR is described here. By utilizing exclusive OR in the second prediction error calculating element 32 of the image encoding apparatus, the second prediction error adding element 33 of the image decoding apparatus becomes identical with the second prediction error calculating element 32; accordingly, the hardware amount can be reduced by integrating these elements. In the case of subtraction, if the reverse operation is represented by a symbol add, $$(A \text{ sub } B) \text{ add } B = A \qquad (4)$$

In the relation (4), sub corresponds to the part executed by the first prediction error calculating element 30 of the image encoding apparatus, and add corresponds to the part executed by the first prediction error adding element 31 of the image decoding apparatus. By execution of operation such as the relation (4), the original value A is restored. Here, sub and add are different operations; consequently, the first prediction error calculating element 30 and the first prediction error adding element 31 are different. To the contrary, in the case of exclusive OR, $$(A \text{ xor } B) \text{ xor } B = A \quad (5)$$

that is, the reverse operation of exclusive OR is exclusive OR. In the relation (5), the first xor corresponds to the part executed by the second prediction error calculating element 32 of the image encoding apparatus, and the second xor corresponds to the part executed by the second prediction error adding element 33 of the image decoding apparatus, and both of them are identical. Thus, in the case of exclusive OR, the second prediction error adding element 33 of the image decoding apparatus and the second prediction error calculating element 32 of the image encoding apparatus can be integrated and it is possible to reduce the hardware amount.

Next, the case in which subtraction is effective is explained. FIG. 6(b) shows an example in which subtraction is effective. T6 is an 8-bit register having the value 32, and T7 and T8 are 8-bit registers having the values 31 and 30, respectively. In this example, operations T6 sub T7 and T7 sub T8 are executed and the same result 1 is obtained. In contrast, the results of operations T6 xor T7 and T7 xor T8 are different. This is because the bit positions of the value 1 are different between T6 and T7, and T7 and T8, whereas the difference of the values between T6 and T7, and T7 and T8 is merely 1. In such a way, in the case where the bit positions of value 1 (or 0) are different, the bias hardly occurs in the distribution of operation results of exclusive OR. In contrast, the bias occurs in the distribution of operation results of subtraction, whereby the entropy becomes smaller and the code amount is reduced.

In the case where the prediction error is calculated as described above, subtraction or exclusive OR is effective depending on values and positions of bits. In addition to the example of effectiveness of subtraction as the prediction error calculating means as disclosed in Japanese Patent Application No. 8-31074, this embodiment can deal with the case where exclusive OR or the image data itself is effective, and is able to reduce the code amount more than the example of Japanese Patent Application No. 8-31074.

In this embodiment, if it is already known which prediction error should be used, processes can be executed without calculating entropy by activating the external selection signal 150 for reducing the code amount.

The present invention is not limited to the above description and a lot of variations are possible. For example, in the description, the prediction error selecting element 34 selects one having the smallest entropy from the packed image data and a couple of prediction errors, but it is possible to dispose three or more prediction error calculating elements, or to select it only from the prediction errors. The criterion of selection may be something other than the entropy.

The foregoing description of preferred embodiment of this invention has been presented for purposes of illustration and description. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image encoding apparatus which performs lossless encoding, comprising:

image inputting means for inputting image information;

packing means for packing the image information inputted through said image inputting means in unit data of a fixed length;

a plurality of pixel value predicting means, each of which predicts a value of the unit data outputted from said packing means by a predetermined manner;

a plurality of prediction error calculating means, each of which calculates a prediction error between the value of the unit data outputted from said packing means and the value predicted by a corresponding one of said plurality of pixel value predicting means;

prediction error selecting means for selecting an optimum prediction error from the prediction errors outputted from said plurality of prediction error calculating means;

selecting means for selecting identification information of one of said plurality of pixel value predicting means which succeeds in prediction, and in the case where no pixel value predicting means succeeds in prediction, selecting the prediction error selected by said prediction error selecting means;

encoding means for encoding the identification information or the prediction error selected by said selecting means by a predetermined manner; and code outputting means for outputting the code generated by said encoding means.

2. The image encoding apparatus according to claim 1, wherein said prediction error selecting means selects and outputs the unit data as the prediction error rather than the prediction errors outputted by said plurality of prediction error calculating means when a predetermined condition is satisfied.

3. The image encoding apparatus according to claim 2, wherein an operation used for prediction error calculation in each of said plurality of prediction error calculating means is one of subtraction and exclusive OR, and each of the subtraction and the exclusive OR is used by at least one of said plurality of prediction error calculating means.

4. The image encoding apparatus according to claim 2, wherein a selection signal is inputted to said prediction error selecting means from the outside of said image encoding apparatus and the unit data outputted from said packing means is outputted as the prediction error by said prediction error selecting means in accordance with the selection signal.

5. The image encoding apparatus according to claim 2, wherein said prediction error selecting means comprises:

entropy calculating means for calculating entropy for each of the unit data outputted from said packing means and prediction errors calculated by said plurality of prediction error calculating means by a predetermined procedure;

selection signal generating means for selecting a smallest entropy from those calculated by said entropy calculating means and generating a selection signal corresponding to the smallest entropy; and means for selecting one of the unit data outputted from said packing means and the prediction errors calculated by said plurality of prediction error calculating means in accordance with the selection signal.

6. The image encoding apparatus according to claim 1, wherein the image information input by the image inputting means includes digital data having different bit lengths, and the unit data output by the packing means has a constant, fixed bit length.

7. The image encoding apparatus according to claim 6, wherein the digital data includes pixel data having a pixel data bit length, and tag data having a tag data bit length less than the pixel data bit length, and the unit data also has said pixel data bit length.

8. An image decoding apparatus which decodes image information encoded by an image encoding apparatus which packs the image information in unit data of a fixed length, predicts a plurality of values of the unit data using a plurality of pixel value predicting means, calculates a plurality of prediction errors between the value of the unit data and the predicted values, selects an optimum prediction error from the plurality of prediction errors, selects identification information of one of said plurality of pixel value predicting means which succeeds in prediction, and when no pixel value predicting means succeeds in prediction, selects the optimum prediction error, and encodes the selected identification information or the optimum prediction error, comprising:

code inputting means for inputting code encoded by said image encoding apparatus;

decoding means for decoding the code inputted through said code inputting means by a predetermined manner;

selecting means for outputting a direction to one of a plurality of predicting means or a prediction error based on information obtained by said decoding means;

each of said plurality of predicting means predicting a value of the unit data inputted through said code inputting means in accordance with a direction from said selecting means;

a plurality of prediction error adding means, each of which calculates a value of the unit data based on the prediction error sent from said selecting means and a predicted value predicted by a predetermined manner;

predicted value selecting means for selecting an optimum predicted value from those calculated by said plurality of prediction error adding means;

unpacking means for unpacking the unit data outputted from one of said predicting means and said predicted value selecting means by a predetermined manner to restore the image information; and image outputting means for outputting the image information sent from said unpacking means.

9. The image decoding apparatus according to claim 8, wherein said predicted value selecting means selects and outputs the prediction error outputted from said selecting means as the predicted value rather than the predicted values outputted from said plurality of predicting means when a predetermined condition is satisfied.

10. The image decoding apparatus according to claim 9, wherein an operation used for calculation of the value of the unit data in each of said plurality of prediction error adding means is one of addition and exclusive OR, and each of the addition and the exclusive OR is used by at least one of said plurality of prediction error adding means.

11. The image decoding apparatus according to claim 9, wherein a selection signal is inputted to said predicted value selecting means from the outside of said image decoding apparatus and one of the prediction error sent from said selecting means and the values of the unit data calculated by said plurality of prediction error adding means is selected in accordance with the selection signal.

12. The image decoding apparatus according to claim 9, wherein said predicted value selecting means comprises:

a plurality of prediction error calculating means, each of which calculates a prediction error between the predicted value predicted by a predetermined manner and the value predicted by a corresponding one of said plurality of predicting means or the optimum predicted value selected by said predicted value selecting means;

entropy calculating means for calculating entropy for each of the values outputted by said plurality of predicting means and said predicted value selecting means and the prediction errors calculated by said plurality of prediction error calculating means by a predetermined procedure;

selection signal generating means for selecting a smallest entropy from those calculated by said entropy calculating means and generating a selection signal corresponding to the smallest entropy; and means for selecting one of the prediction error sent from said selecting means and the predicted values calculated by said plurality of prediction error adding means in accordance with the selection signal.

13. The image decoding apparatus according to claim 8, wherein the image information encoded by the image encoding apparatus and restored by the unpacking means includes digital data having different bit lengths, and the unit data packed by the image encoding apparatus and unpacked by the unpacking means has a constant, fixed bit length.

14. The image decoding apparatus according to claim 13, wherein the digital data includes pixel data having a pixel data bit length, and tag data having a tag data bit length less than the pixel data bit length, and the unit data also has said pixel data bit length.

15. An image encoding method which performs lossless encoding, comprising the steps of:

using an image inputting means to input image information;

using a packing means to pack the image information inputted through said image inputting means in unit data of a fixed length;

using a plurality of pixel value predicting means, each of which predicts a value of the unit data outputted from said packing means by a predetermined manner, to predict a plurality of values of the unit data;

using a plurality of prediction error calculating means, each of which calculates a prediction error between the value of the unit data outputted from said packing means and the value predicted by a corresponding one of said plurality of pixel value predicting means;

using a prediction error selecting means to select an optimum prediction error from the prediction errors outputted from said plurality of prediction error calculating means;

using a selecting means to select identification information of one of said plurality of pixel value predicting means which succeeds in prediction, and when no pixel value predicting means succeeds in prediction, selecting the prediction error selected by said prediction error selecting means;

using an encoding means to encode the identification information or the prediction error selected by said selecting means by a predetermined manner; and using a code outputting means to output the code generated by said encoding means.

16. An image decoding method which decodes image information encoded by an image encoding apparatus which packs the image information in unit data of a fixed length, predicts a plurality of values of the unit data using a plurality of pixel value predicting means, calculates a plurality of prediction errors between the value of the unit data and the predicted values, selects an optimum prediction error from the plurality of prediction errors, selects identification information of one of said plurality of pixel value predicting means which succeeds in prediction, and when no pixel value predicting means succeeds in prediction, selects the optimum prediction error, and encodes the selected identification information or the optimum prediction error, comprising the steps of:

using a code inputting means to input code encoded by said image encoding apparatus;

using a decoding means to decode the code inputted through said code inputting means by a predetermined manner;

using a selecting means to output a direction to one of a plurality of predicting means or a prediction error based on information obtained by said decoding means;

each of said plurality of predicting means predicting a value of the unit data inputted through said code inputting means in accordance with a direction from said selecting means;

using a plurality of prediction error adding means, each of which calculates a value of the unit data based on the prediction error sent from said selecting means and a predicted value predicted by a predetermined manner;

using a predicted value selecting means to select an optimum predicted value from those calculated by said plurality of prediction error adding means;

using an unpacking means to unpack the unit data outputted from one of said predicting means and said predicted value selecting means by a predetermined manner to restore the image information; and using an image outputting means to output the image information sent from said unpacking means.

* * * * *